(12) United States Patent
Dunphy

(10) Patent No.: US 7,995,258 B2
(45) Date of Patent: Aug. 9, 2011

(54) ANGLE DIVERSITY ANTISPECKLING IN SPOT DISPLAYS

(75) Inventor: James Christopher Dunphy, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 666 days.

(21) Appl. No.: 11/951,663

(22) Filed: Dec. 6, 2007

(65) Prior Publication Data

US 2009/0147222 A1 Jun. 11, 2009

(51) Int. Cl.
*G02B 26/08* (2006.01)

(52) U.S. Cl. .................................................... 359/208.1

(58) Field of Classification Search ............... 359/205.1, 359/208.1
See application file for complete search history.

(56) References Cited

U.S. PATENT DOCUMENTS

| 4,035,068 A | 7/1977 | Rawson |
| 5,013,108 A * | 5/1991 | Van Amstel ............... 359/208.1 |
| 5,801,869 A * | 9/1998 | Yoshikawa et al. ........ 359/208.1 |
| 5,845,981 A | 12/1998 | Bradley |
| 6,540,362 B1 | 4/2003 | Janssen |
| 6,577,429 B1 | 6/2003 | Kurtz et al. |
| 6,897,992 B2 * | 5/2005 | Kikuchi ........................ 355/53 |
| 7,095,541 B2 | 8/2006 | Liu |
| 7,147,332 B2 | 12/2006 | Conner |

* cited by examiner

*Primary Examiner* — Euncha P Cherry
(74) *Attorney, Agent, or Firm* — Charles A. Brill; Wade James Brady, III; Frederick J. Telecky, Jr.

(57) ABSTRACT

Improvement of speckling noise is discussed in which a central light beam received at a double-sided mirror is divided into a plurality of sub-beams. An intensity of these sub-beams decays from a second sub-beam to a last sub-beam of the plurality. Each sub-beam is also separated at the double-sided mirror by at least a first length, such as the coherence length or intrinsic divergence, and reflected toward a display screen. The configuration of the double-sided mirror focuses the sub-beams to converge with a first sub-beam on the display screen at different angles. The decreasing intensity and different angles of impact with the screen decreases the spatial coherence of the display light. The angle diversity and combination of multiple sub-beams having different intensities offers a non-time-averaging means to decrease speckle noise without downgrading the beam quality or display resolution.

23 Claims, 5 Drawing Sheets

ANGLE DIVERSITY ANTISPECKLING IN SPOT DISPLAYS

TECHNICAL FIELD

The present disclosure relates, in general, to spot displays, and, more particular, to an angle diversity antispeckling in such spot displays.

BACKGROUND

Rastered or "flying" spot displays have recently shown promise as a solution for very small projector applications, such as cell phones, notebook computers, digital cameras, and the like. Such spot displays have their origin over one hundred years ago in mechanical televisions and phototelegraphy (i.e., facsimile). The principal behind early flying spot scanners used a bright, narrow beam of light which would shine through the holes of a Nipkow disk, which is a disk with a series of holes typically cut in a spiral pattern in the disk. This light would then illuminate the subject, usually standing in a darkened studio. The resulting scanning spot of light could usually complete sixteen or more scans per second. The light would then reflect back to one or more photoelectric cells. While television has long since abandoned this scanning method, some modern graphical scanners still use a flying spot scanning system.

Because of its simple approach and the improvement in laser technology, rastered or flying spot scanning and display, as noted above, are now being considered an attractive implementation for very small projectors. In modern application, median power, single mode lasers (usually around 100 mW) enable realistic design of such small projectors. The median power and single mode of these lasers allows for the laser mechanism to be less complex, which lends itself to such small applications. Such systems typically generate a picture by rasterizing a set of red, green, and blue laser beams across a screen while modulating the beam intensity.

One main drawback to rastered spot displays is speckling. Because of the coherence of laser light, with a narrow wavelength, direction range, and (often) polarization, light waves scattered by nearby points on the screen often interfere at the observer location (such as a human eye or camera). This interference generally introduces an amplitude or brightness noise in the perceived light, commonly described as "speckle," which degrades the image quality. With ordinary light this speckle noise is averaged to near zero because each wavelength, incoming light angle, and two polarizations generally produces distinctly different speckle patterns. As all of these speckle patterns are uncorrelated, i.e. random in different ways, they average to zero as the number of them increases. Thus, one method that has been considered to alleviate some of the speckle noise would be changing the mode of the lasers. However, altering the single-mode nature of the laser would generally result in an unacceptable loss of display resolution.

Speckle effect can also be decreased by reducing one or more of the coherence degrees of light: polarization, temporal, and spatial. In general applications, a time averaging of a multiple speckle pattern is typically used, which results in the pattern appearing sequentially at the display screen. However, in the case of rastered or flying spot displays, time averaging cannot be used because the light beam is only present at any given spot on the screen for a very short period of time. Moreover, as noted above, the lasers should remain single mode spatially in order to preserve resolution.

SUMMARY

These and other problems are generally solved or circumvented, and technical advantages are generally achieved, by representative embodiments directed to decreasing the spatial coherence of the display light using angle diversity of the light beams. This angle diversity offers a non-time-averaging means to decrease speckle noise without downgrading the beam quality or display resolution.

In accordance with one embodiment of the present disclosure, a method includes dividing a central light beam received from a raster scanning mirror into a plurality of sub-beams, where an intensity of the sub-beams decays from a second sub-beam to a last sub-beam of the plurality. The method further includes separating each sub-beam by at least a first length and reflecting the plurality of sub-beams toward a display screen, where the sub-beams are focused to converge with the first sub-beam on the display screen at different angles to the display screen.

In accordance with another embodiment of the present disclosure, a rastered spot display system includes a projector and a display screen configured to display images from the projector. The projector is made up from a plurality of lasers, a processing controller configured to process a display image signal and control the lasers according to the display image signal, a raster scanning mirror configured to rasterize a light beam produced by one of the lasers, and a double-sided mirror configured to divide and separate the rasterized light beam into a plurality of beamlets, where an intensity of the plurality of beamlets decays from the second beamlet to the last beamlet of the plurality. In some instances, the second beamlet will be brighter than the first. The double-sided mirror also focuses the beamlets to converge with the first sub-beam on the display screen at different angles to the display screen.

In accordance with another embodiment of the present disclosure, a double-sided mirror for a flying spot display system is made up of a front reflective surface having a reflectivity between approximately 10% and 80%, where the front reflective surface divides a central beam received from a raster scanning mirror into a plurality of sub-beams. The double-sided mirror also includes a rear reflective surface having a reflectivity near 100%, a parabolic shape configured to focus the plurality of sub-beams to converge with a first sub-beam of the plurality of sub-beams on the display screen, and a relative position with respect to the front reflective surface, such that the rear reflective surface is a fraction of a degree from parallel with the front reflective surface. The relative position of the rear reflective surface also focuses the sub-beams to converge with the first sub-beam on the display screen at different angles where the sub-beams reflecting between the front and rear reflective surfaces become separated by a first length.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently disclosed embodiments are discussed in detail below. It should be appreciated, however, that the present disclosure provides many applicable concepts that can be embodied in a wide variety of specific contexts. The specific embodiments discussed are merely illustrative of specific ways to make and use the disclosed material, and do not limit the scope in any way.

In a flying spot display system, light arrives at each point on the screen in a narrow, coherent beam. Assuming that the screen is near the beam waist location, which is the point along the beam at which the beam width is at its minimum, the beam phase fronts at the screen will be flat, much like a plane wave. The angular range of the light at each point on the screen is then the beam diameter over the distance from the projector, referred to as the throw distance. For high resolution displays, the spot size should be kept as small as possible, which means that the incoming light angle range is very limited. Often, for design reasons, the beam waist is located closer to the projector. This orientation makes the wavefront at the screen curved in such a way as to reduce the effective range of angles even further. This limited angular range is the main contributor to high speckle noise in these types of displays.

Figure 1:
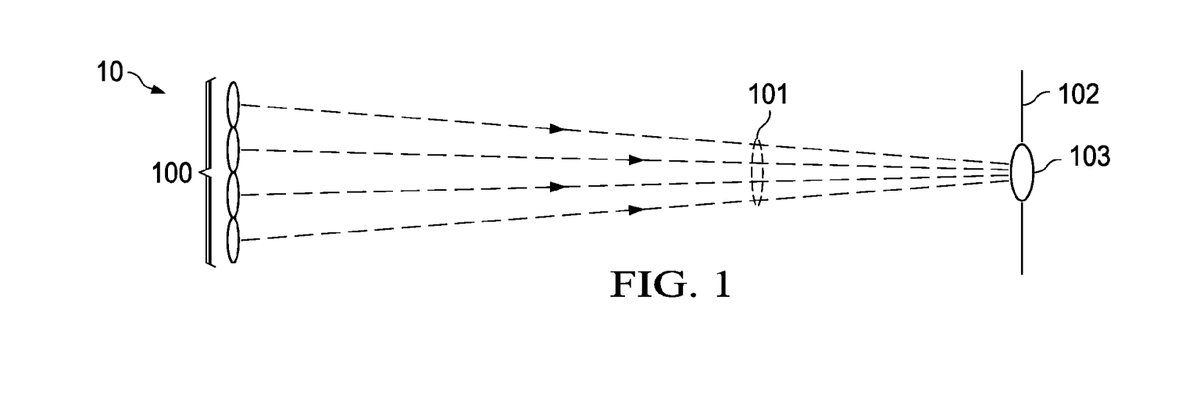
FIG. 1 is a diagram illustrating an antispeckle system configured according to one embodiment.

FIG. 1 is a diagram illustrating antispeckle system 10 configured according to one embodiment. Multiple beams 101 emanate from lens elements 100 focusing each of beams 101 onto screen 102 at focal point 103. This multiple beam focusing effectively increases the angular diversity of beams 101 as displayed on screen 102. This method of increasing the angular diversity increases the number of decorrelated speckle patterns, reducing the speckle noise, and does not significantly degrade resolution of the resulting image. However, the depth of field is reduced over which the image is in focus. Thus, the image resolution may degrade when the screen is placed far from the nominal design distance.

As noted above, the separation of the sub-beams at the near field of the projector causes decorrelation of the speckle patterns. A good design rule for ensuring optimal decorrelation is to separate the beams by, at least, more than their intrinsic divergence or ensure that the optical path difference is, at least, the coherence length. Optical path differences of less than the coherence length will still result in a reduced speckle contrast or noise, but it will do so at a lower degree than for longer optical path differences.

Figure 2:
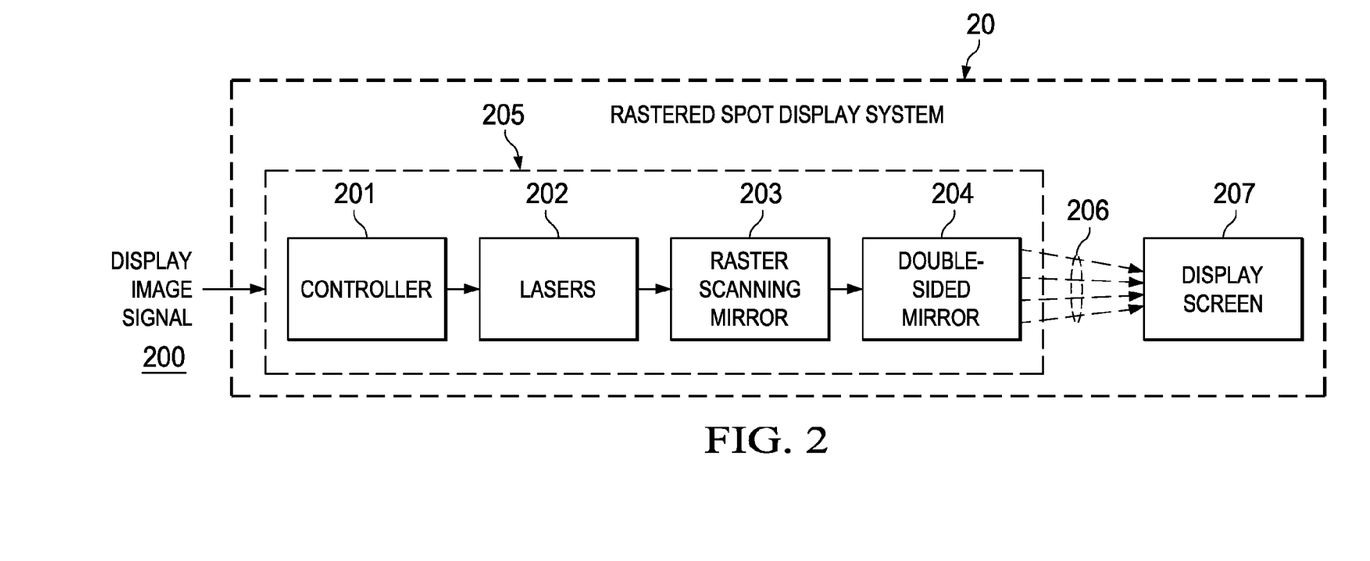
FIG. 2 is a block diagram illustrating a rastered spot display system configured to reduce speckle noise according to one embodiment.

FIG. 2 is a block diagram illustrating rastered spot display system 20 configured to reduce speckle noise according to one embodiment. Rastered spot display system 20 comprises, generally, projector 205 and display screen 207. Projector 205 includes controller 201, which controls the operation and modulation of lasers 202. Typical systems may include a set of red, green, and blue lasers for providing the light source for the display. Controller 201 interprets display image signal 200 and controls the firing and modulation of lasers 202. Raster scanning mirror 203 rasterizes the particular beam coming from lasers 202 according to display image signal 200. Double-sided mirror 204 is placed into projector 205 after raster scanner mirrors 203 to break up the beam into a group of sub-beams or beamlets, sub-beams 206. The configuration of double-sided mirror 204 causes sub-beams 206 to be of decaying intensity after the second one and laterally displaced along a line in the near field of projector 205. However, each of sub-beams 206 is focused by double-sided mirror 204 to converge to a spot at the nominal distance from display screen 207.

It should be noted that while rastered spot display system 20 is illustrated having only a few block functional regions, one skilled in the art will readily appreciate that the actual implementation of a rastered spot display system, such as rastered spot display system 20, comprises multiple, detailed elements that may make up each of the illustrated functional blocks, and may also contain additional components and functional blocks in order to implement the system. The basic structure illustrated in FIG. 2 is presented for clarity in describing the embodiment depicted.

Figure 3:
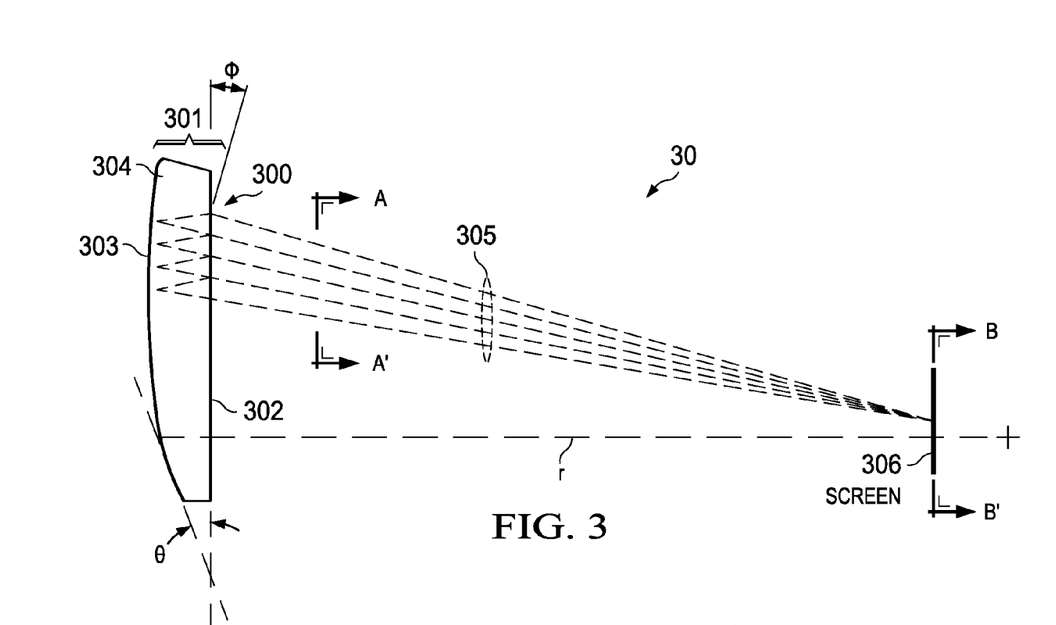
FIG. 3 is a diagram detailing an angle diversity portion of a flying spot display configured according to one embodiment.

FIG. 3 is a diagram detailing angle diversity portion 30 of a flying spot display configured according to one embodiment. As beam 300 is reflected from the raster scanner mirrors it encounters double-sided mirror 301. Double-sided mirror 301 comprises front surface mirror 302, back surface mirror 303, and optical substrate 304 between front and back surface mirrors 302-303. Optical substrate 304 may comprise any acceptable material capable of transporting light, including air. In the embodiment illustrated in FIG. 3, front surface mirror 302 is planar and partially reflective. Various embodiments of front surface mirror 302 may have a reflectivity range between about 10% and 80%, the implementation of which is well known in the art. Back surface mirror 303 is a near perfect reflector and is tilted by a fraction of a degree, $\theta$, from parallel with front surface mirror 302, and has a slight parabolic shape. In selected embodiments, the radius of curvature, r, of the parabolic shape of back surface mirror 303 is very large enabling a large positive focal length.

It should be noted that, in additional and/or alternative embodiments, the angle, $\theta$, that determines the position of the focal plane at which the beams converge may be on the order of the spacing between the two mirrors divided by the distance to the screen. This angular measurement, typically calculated in radians, results in well under a degree. Thus, the radius of curvature would typically be beyond the screen, as shown. Additionally, in additional and/or alternative embodiments, the use of flat mirrors, which have a resulting radius of infinity, are sufficient for screen distances that are long compared to the mirror separation.

Front surface mirror 302 is oriented at an angle, $\Phi$, with respect to beam 300. In the embodiment illustrated in FIG. 3, $\Phi$ is 45°. The scanner varies this angle as the image is rastered. Thus, at different stages of the projection, the angle, $\Phi$, will be configured to angles of approximately 45° or greater. With such orientations, a first beam of reflected sub-beams 305 is reflected at an angle of nominally 90° towards screen 306. The optimal angle for $\Phi$ will depend on the limiting angles of the scanner.

Light from beam 300, which passes through front surface mirror 302, passes through optical substrate 304 and onto back surface mirror 303. It is then reflected back toward front surface mirror 302. Some of this reflected light will pass through front surface mirror 302 toward screen 306 and, because of the shape and orientation of back surface mirror 303, will converge at the same point as the first reflected beam on screen 306. Still other reflected light will be reflected back from front surface mirror 302 creating several beams bouncing back and forth within double-sided mirror 301. The resulting beams, sub-beams 305, are offset by an equal spacing in the plane of the screen and experience a decaying intensity the longer the individual beam bounces around within double-sided mirror 301. The displacement experienced by the reflected beams may be calculated for the embodiment illustrated in FIG. 3 by the thickness of front surface mirror 302 multiplied by the sine of Φ of front surface mirror 302 and corrected by the glass index of front surface mirror 302 and any substrate index attributable to optical substrate 304.

The slight parabolic shape of back surface mirror 303 allows sub-beams 305 to converge at screen 306 regardless of the beam position in the raster scan. If, back surface mirror 303 were planar, the rastered image generated at screen 306 by each consecutive beam of sub-beams 305 would be consecutively larger at screen 306 because the beam path becomes longer and longer. The parabolic curve to back surface mirror 303 counteracts this displacement by slightly converging or re-converging the light with each reflection off of back surface mirror 303. Therefore, the design of double-sided mirror 301 ensures that sub-beams 305, which pass through and are initially displaced by front surface mirror 302, converge at screen 306 over the entire image field.

It should be noted that while specific examples of angles and orientations have been provided in FIG. 3, such specific examples were given for purposes of the embodiment illustrated in FIG. 3. Additional and/or alternative embodiments may be implemented with different angles and orientations which configure the system to operate as described herein.

Figure 4A:
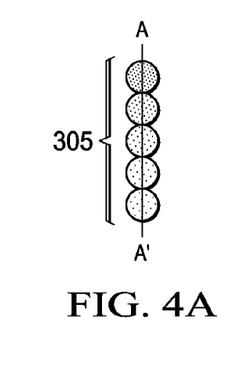
FIGS. 4A and 4B are diagrams illustrating the orientation of the sub-beams at points along the beam path illustrated in FIG. 3.
Figure 4B:
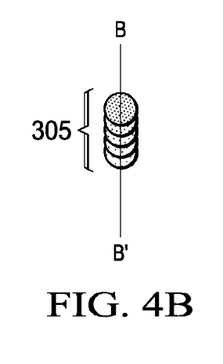

FIGS. 4A and 4B are diagrams illustrating the orientation of sub-beams 305 at points along the beam path illustrated in FIG. 3. The cross-section defined by the line A-A' illustrates the displacement and decaying intensity of sub-beams 305 in the near field, close to the projector. The beam spot nearest point A represents part of the light of beam 300 (FIG. 3) that was initially reflected by front surface mirror 302 (FIG. 3). Because it has not been displaced or decayed by travel through front surface mirror 302, optical medium 304, and reflection off of back surface mirror 303 (all of FIG. 3), it is sometimes the most intense beam of sub-beams 305. While an ideal case would provide for equal intensity of sub-beams 305, in practice, it has not been yet possible to maintain such equal intensity. Instead the first two of sub-beams 305, closest to point A, have nearly equal intensity. As the beams get closer to point A' from the second beamlet, they get increasingly less intense.

The configuration in which the first and second beamlet of sub-beams 305 are nearly equal in intensity corresponds to a front surface reflectivity of approximately 40%. After two passes through the front surface mirror and one reflection off of the near 100% mirror, the intensity corresponds to an approximate 36% reflectivity (i.e., 60%*60%=36%). On the next pass, with four passes through the front surface mirror and two reflections off of the near 100% mirror, the intensity is equivalent to an approximate 14.4% (i.e., 60%*40%*60=14.4%), and the next, an approximate 5.76% (i.e., 60%*40%*40%*60%=5.76%), and so on.

FIG. 4B illustrates the convergence of sub-beams 305 at screen 306 (FIG. 3) defined by the line B-B'. Because of the angle θ offset between front and back surface mirrors 302-303 (FIG. 3), and the parabolic shape of back surface mirror 303 (FIG. 3), each of sub-beams 305 converge at a spot commensurate with the intersection of the first beam of sub-beams 305 and screen 306. The convergence from the spread orientation illustrated in FIG. 4A and the impact point illustrated in FIG. 4B provide an increased angle diversity range at screen 306 (FIG. 3). Speckling is, therefore, reduced because the speckle patterns generated by coherent light arriving from sufficiently different incoming angles are not correlated. These separate speckle patterns are independent, random patterns. The uncorrelated speckle patterns average to form a more uniform pattern which reduces the speckle contrast or noise at a rate of approximately $N^{-1/2}$, where N is the number of independent patterns. Even just two separate coherent beams arriving at the same point with different angles will create two de-correlated speckle patterns leading to a half-power or 3 decibel (dB) speckle noise reduction.

It should be noted that the speckle reduction system may be implemented using numerous different embodiments, components, configurations, and the like. FIGS. 5A-5E illustrate a few example embodiments of such systems.

Figures 5A, 5B:
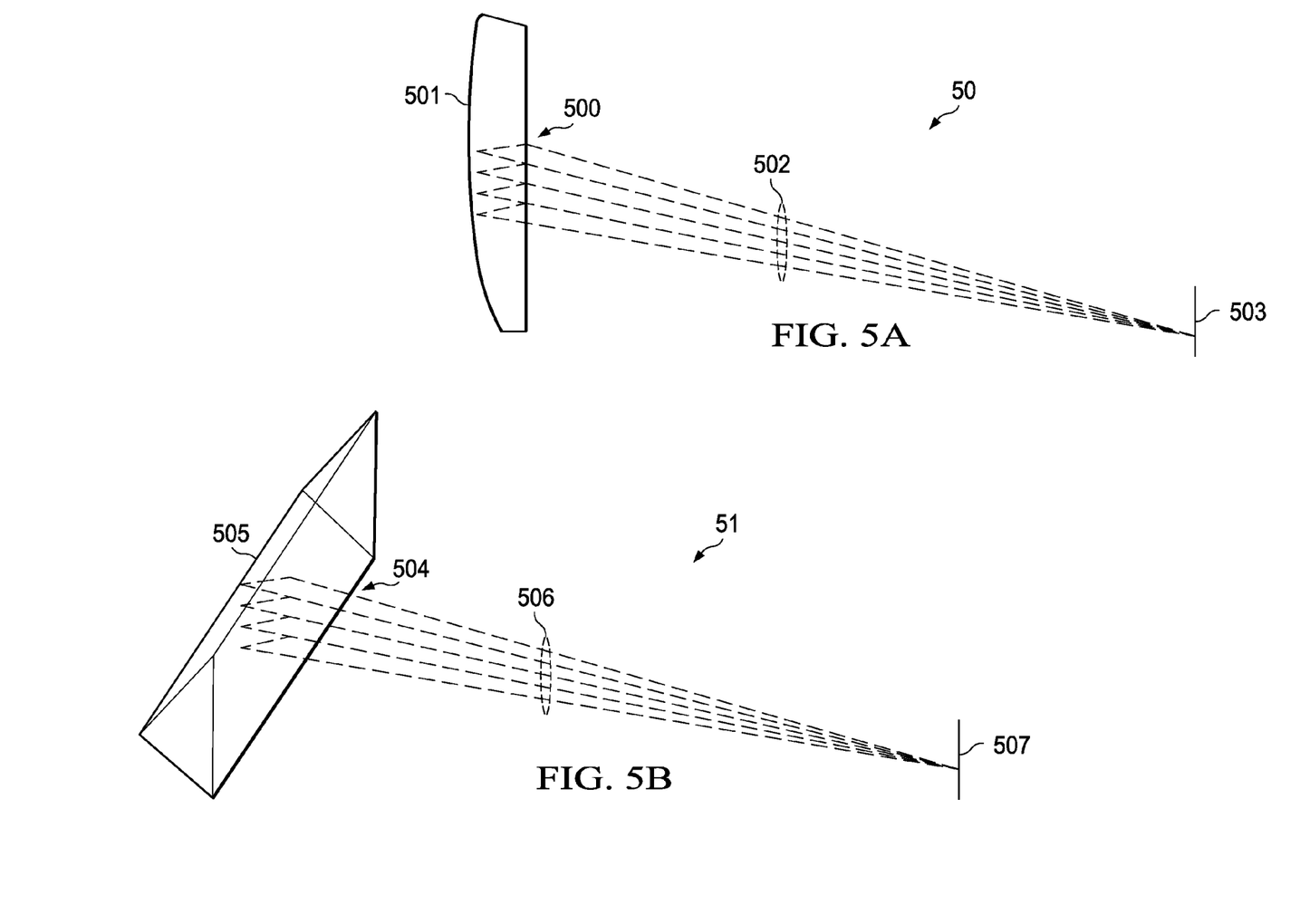
FIGS. 5A-5E are diagrams illustrating various embodiments of speckle reduction systems configured according to one embodiment described herein.

FIG. 5A is a diagram illustrating speckle reduction system 50 configured according to one embodiment. While the embodiment of angle diversity portion 30 (FIG. 3), implemented double-sided mirror element 300 (FIG. 3) as two separate surfaces surrounding a middle substrate, optical substrate 304, speckle reduction system 50 configures double-sided mirror element 501 as a single glass wedge. The front side of double-sided mirror element 501 is partially reflective, similar to the embodiment of FIG. 3, while the back side is slightly parabolic in shape and has an offset with respect to the parallel of the front side of a fraction of a degree. This configuration allows central beam 500 to be partially reflected and divided into beamlets 502 through reflection between the front and back sides of double-sided mirror element 501. The shape and orientation of the back side of double-sided mirror element 501 focuses beamlets 502, such that they each converge together on screen 503. Again, through use of double-sided mirror element 501, speckle noise is reduced by increasing the angle diversity of the arriving spots.

FIG. 5B is a diagram illustrating speckle reduction system 51 configured according to one embodiment. Instead of providing the beam separation and displacement through a double-mirror, speckle reduction system 51 uses diffractive optical element 505 to divide beam 504 into sub-beams 506, having successive displacement and decreasing intensity. Thus, diffractive optical element 505 divides beam 504 into sub-beams 506, which, because of the properties of diffractive optical element 505, allow sub-beams 506 to converge on roughly the same spot at screen 507.

Figures 5C, 5D:
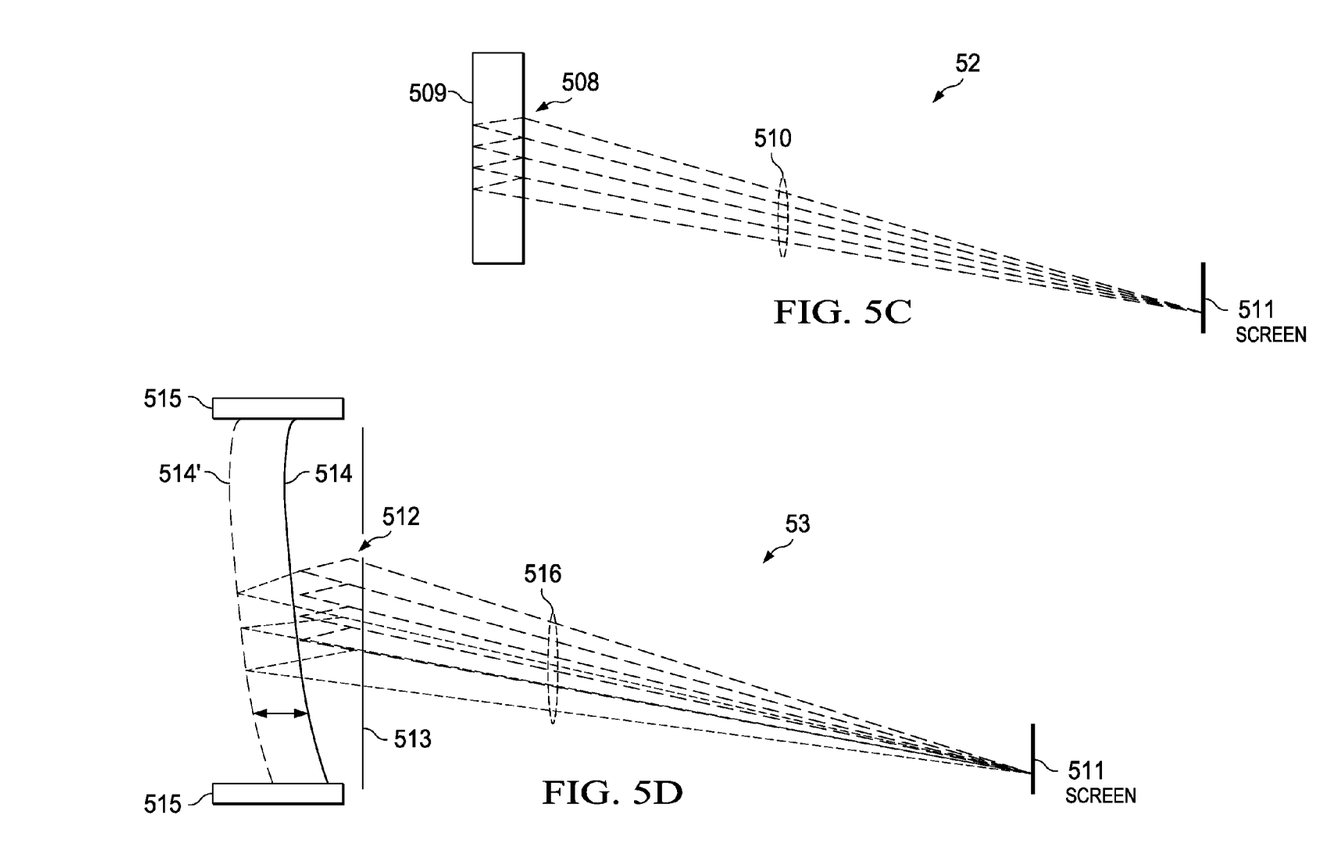

FIG. 5C is a diagram illustrating speckle reduction system 52 configured according to one embodiment. Here, instead of using a mirror or diffractive optical element, holographic optical element 509 is used to create sub-beams 510 from central beam 508. Holographic optical element 509 uses a hologram to separate and reflect central beam 508 into multiple beams of sub-beams 510 each partially displaced from one another and each slightly less intense than the previous beam. The focusing element of holographic optical element 509 allows sub-beams 510 to converge on screen 511 at roughly the same point and at multiple different angles. Thus, the speckle contrast is reduced at screen 511.

Because of the wavelengths of some lasers, the beam separation that should be used to ensure decorrelation between each beamlet may be difficult to reach. For example, the typical coherence length of a common green laser offered by Corning Incorporated, the Corning G-11, is 10 mm. It is not functionally realistic to have a 10 mm optical path difference between each beamlet. Such a large distance would likely make any commercial implementations impractical.

FIG. 5D is a diagram illustrating speckle noise reduction system 53 configured according to one embodiment. Speckle noise reduction system 53 is configured to handle lasers having very large coherence lengths. The hardware of speckle noise reduction system 53 includes front surface mirror 513 configured having partial reflectivity within the range of about 10% to 80% and back surface mirror 514 having a near perfect reflectivity, i.e., ≅100%. Back surface mirror 514 is mounted on actuators 515 which, when activated, cause back surface mirror 514 to move back-and-forth between the illustrated position and the position noted by back surface mirror 514'. The additional displacement of back surface mirror 514 is able to accommodate lasers having a longer coherence length. The back-and-forth motion changes the phase relationship between the sub-beams of the laser. Thus, as the non-reflected portion of central beam 512 passes through front surface mirror 513, the periodic motion of back surface mirror 514 changes the phase relationship between sub-beams 516. While the motion of back surface mirror 514 changes that relationship, sub-beams 516 are still focused onto screen 517 to meet at the same location as the first reflected sub-beam from front surface mirror 513.

The translation of back surface mirror 514 should be at least half of a wavelength per video frame and may be approximately 1 wavelength of light or 500 nm. In the embodiment illustrated in FIG. 5D, the motion of back surface mirror 514 is periodic. However, it should be noted that additional and/or alternative embodiments may use random motion of back surface mirror 514.

It should be further noted that actuators 515 may comprises any variety of highly-accurate actuator motors or transducers, such as piezoelectric actuators, pyroelectric actuators, voice-coils, and the like. Additionally, sound waves may be used to generate the motion of back surface mirror 514.

Figure 5E:
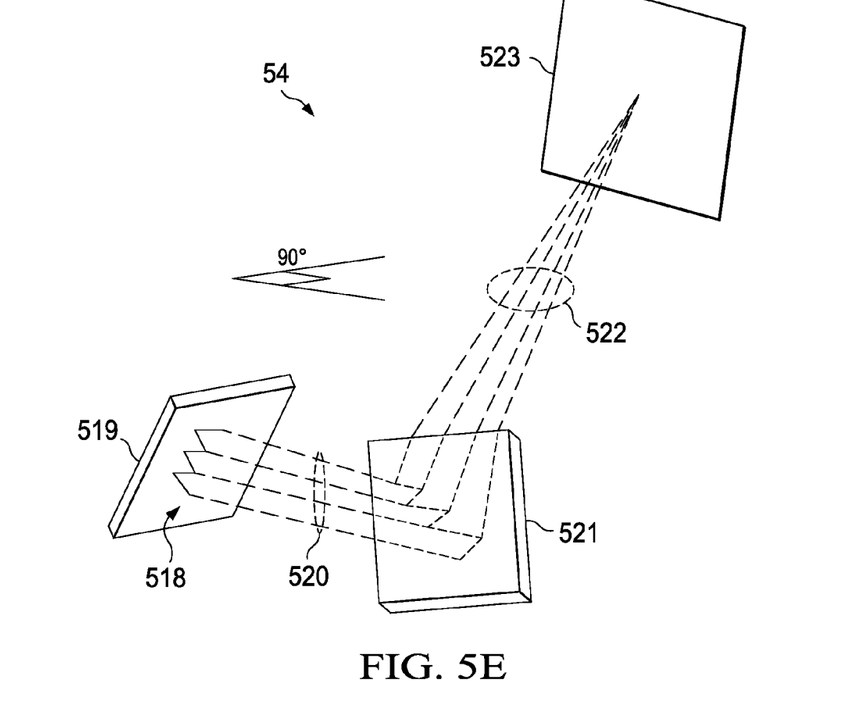

FIG. 5E is a diagram illustrating speckle noise reduction system 54 configured according to one embodiment described herein. Instead of a single double-sided mirror as depicted in the prior embodiments, speckle noise reduction system 54 includes two double-sided mirrors, mirrors 519 and 521, arranged at right angles to each other. Central beam 518 encounters mirror 519 after which a first sub-beam is directly reflected by the front surface of mirror 519. The light beams from central beam 518 that pass through the front surface get reflected back-and-forth between the two surfaces of mirror 519 forming the remainder of sub-beams 520 directed at mirror 521. As sub-beams 520 encounter mirror 521, a similar reflection process occurs directing sub-beams 522 toward screen 523. Because of the sequential positioning of mirrors 519 and 521, sub-beams 522 are patterned in two dimensions as a grid, instead of along a line, as in the prior, single mirror unit embodiments. Mirror 521 also focuses each of sub-beams 522 to intersect at screen 523 at a single point. The configuration of mirrors 519 and 521, placed sequentially and oriented at right angles with each other, which produces the two-dimensional grid of sub-beams 522, provides even further increased angle diversity and, thus, speckle reduction.

Figure 6:
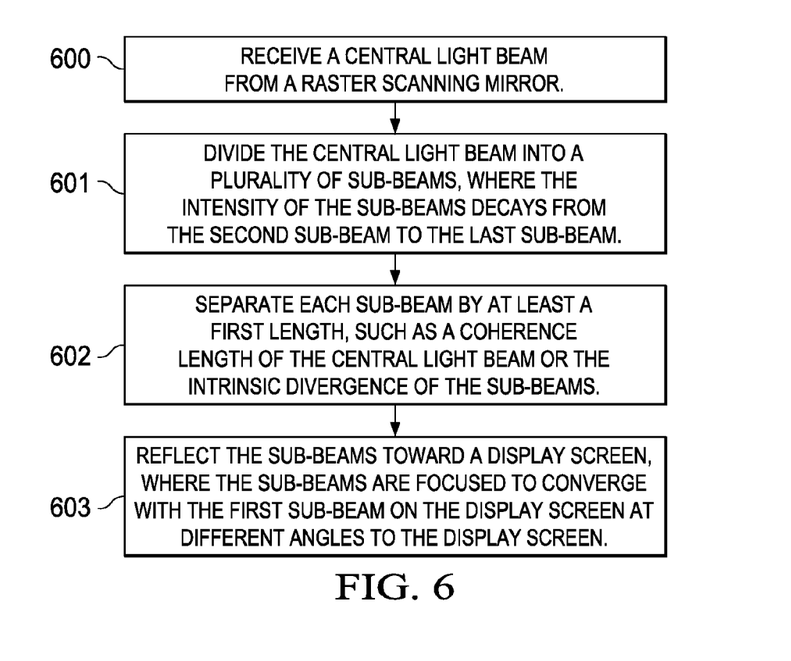
FIG. 6 is a flowchart illustrating example steps executed to implement one embodiment described herein.

FIG. 6 is a flowchart illustrating example steps executed to implement one embodiment described herein. In step 600, a central light beam is received from a raster scanning mirror. The central light beam is divided into a plurality of sub-beams, in step 601, where the intensity of the sub-beams decays from the second sub-beam to the last sub-beam. Each sub-beam is separated by at least a first length, in step 602, such as the coherence length of the central light beam or the intrinsic divergence of the sub-beams. In step 603, the sub-beams are reflected toward a display screen, where the sub-beams are focused to converge with the first sub-beam on the display screen at different angles to the display screen.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present embodiments, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    dividing a central light beam received from a raster scanning mirror into a plurality of sub-beams;
    separating each sub-beam of said plurality of sub-beams by at least a first length;
    reflecting said plurality of sub-beams toward a display screen;
    converging said plurality of sub-beams with a first sub-beam on said display screen at different angles to said display screen, said dividing, separating, reflecting, and converging are conducted by a double-sided mirror.

2. The method of claim 1, wherein an intensity of said plurality of sub-beams decays from a second sub-beam of said plurality of sub-beams to a last sub-beam of said plurality of sub-beams.

3. The method of claim 1 wherein said first length corresponds to one of:
    a coherence length of said central light beam; or
    an intrinsic divergence of said plurality of sub-beams.

4. The method of claim 1 further comprising:
    displacing a mirror reflector of said rastered spot projector to manipulate an optical path length of said plurality of sub-beams, wherein said optical path length corresponds to said coherence length.

5. The method of claim 1 wherein said double-sided mirror comprises:
    a front surface mirror having a reflectivity between about 10% and 80%; and
    a rear surface mirror having a reflectivity near 100%.

6. The method of claim 1 wherein said double-sided mirror comprises one of:
    a composite mirror having a front surface mirror, a back surface mirror, and an optical medium between said front and back surface mirrors, wherein said front surface mirror, said back surface mirror, and said optical medium are bonded into a single unit;
    a glass wedge;
    a diffractive element;
    a holographic optical element; and
    a deformable mirror unit having a front side mirror and a back side mirror, said back side mirror connected to one or more displacement actuators for displacing said back side mirror according to one or more operating conditions.

7. The method of claim 1 wherein said double-sided mirror comprises:
   a front surface mirror; and
   a rear surface mirror, said rear surface mirror having a parabolic shape configured to focus said plurality of sub-beams to converge with said first sub-beam on said display screen.

8. A rastered spot display system comprising:
   at least one laser;
   a processing controller configured to process a display image signal and control said at least one laser according to said display image signal;
   a raster scanner mirror configured to rasterize a light beam produced by one of said at least one laser; and
   a double-sided mirror configured to:
      divide and separate said rasterized light beam into a plurality of beamlets; and
      converge said plurality of beamlets with a first sub-beam on a display plane at different angles to said display plane.

9. The rastered spot display system of claim 8, wherein an intensity of said plurality of beamlets decays from a second beamlet of said plurality of beamlets to a last beamlet of said plurality of beamlets.

10. The rastered spot display system of claim 8, wherein said double-sided mirror comprises:
    a front mirror having a reflectivity between approximately 10% and 80%; and
    a rear mirror a reflectivity near 100%.

11. The rastered spot display system of claim 10, wherein said reflectivity of said front mirror is approximately 40%.

12. The rastered spot display system of claim 10 further comprising:
    one or more actuators connected to said rear surface mirror, wherein said one or more actuators displace said rear mirror according to one or more operating conditions.

13. The rastered spot display system of claim 10, wherein said front mirror is positioned at an angle to said rasterized light beam, such that said first beamlet is reflected from said front mirror at an angle of nominally 90° towards said display.

14. The rastered spot display system of claim 10, wherein said parabolic shape has a large radius of curvature such that said rear mirror possesses a large positive focal length.

15. The rastered spot display system of claim 8, wherein said double-sided mirror is configured to separate said plurality of beamlets by a first length comprising one of:
    a coherence length of said rastered light beam; or
    an intrinsic divergence of said plurality of beamlets.

16. The rastered spot display system of claim 8, wherein said double-sided mirror comprises:
    a composite mirror wherein said front mirror, said rear mirror, and an optical medium between said front and rear mirrors are bonded into a single unit;
    a glass wedge;
    a diffractive element;
    a holographic optical element;
    a sequence of two double-sided mirrors arranged at right angles to one another, wherein light beams reflected off of a first of said sequence is directed at a second of said sequence and said light beams reflected off of said second of said sequence are reflected toward said display; and
    a deformable mirror unit, wherein said rear surface mirror is connected to one or more actuators for displacing said rear mirror according to one or more operating conditions.

17. A double-sided mirror for a flying spot display system, said double-sided mirror comprising:
    a front reflective surface having a reflectivity between approximately 10% and 80%, wherein said front reflective surface divides a central beam received from a raster scanning mirror into a plurality of sub-beams; and
    a rear reflective surface having:
       a reflectivity near 100%;
       a parabolic shape configured to focus said plurality of sub-beams to converge with a first sub-beam of said plurality of sub-beams on said display screen; and
       a relative position with respect to said front reflective surface, such that said rear reflective surface is a fraction of a degree from parallel with said front reflective surface, such that said plurality of sub-beams are focused to converge with said first sub-beam on said display screen at different angles;
    wherein ones of said plurality of sub-beams reflecting between said front and rear reflective surfaces are separated by a first length.

18. The double-sided mirror of claim 17, wherein said parabolic shape has a large radius of curvature such that said rear reflective surface possesses a large positive focal length.

19. The double-sided mirror of claim 17, wherein said first length comprising one of:
    a coherence length of said rastered light beam; or
    an intrinsic divergence of said plurality of beamlets.

20. The double-sided mirror of claim 17, wherein said double-sided mirror comprises:
    a composite mirror wherein said front reflective surface, said rear reflective surface, and an optical medium between said front and rear reflective surfaces are bonded into a single unit;
    a glass wedge;
    a diffractive element;
    a holographic optical element;
    a sequence of two double-sided mirrors arranged at right angles to one another, wherein light beams reflected off of a first of said sequence is directed at a second of said sequence and said light beams reflected off of said second of said sequence are reflected toward said display screen; and
    a deformable mirror unit, wherein said rear reflective surface is connected to one or more actuators for displacing said rear reflective surface according to a coherence length of said rastered light beam.

21. The method of claim 1, comprising:
    a second double-sided mirror arranged at right angles to said double-sided mirror, wherein light beams reflected by said double-sided mirror are directed to said second double-sided mirror prior to being reflected toward said display screen.

22. The method of claim 8, comprising:
    a second double-sided mirror arranged at right angles to said double-sided mirror, wherein light beams reflected by said double-sided mirror are directed to said second double-sided mirror prior to being reflected toward said display plane.

23. The method of claim 10, said rear mirror having a parabolic shape.

* * * * *